(12) United States Patent
Meguro

(10) Patent No.: US 6,236,540 B1
(45) Date of Patent: May 22, 2001

(54) ASSEMBLY FOR CONNECTING THE UPPER AND LOWER CARTRIDGE HALVES OF A DISC CARTRIDGE

(75) Inventor: Hiroshi Meguro, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/284,031
(22) PCT Filed: Jul. 31, 1998
(86) PCT No.: PCT/JP98/03436
  § 371 Date: Jun. 28, 1999
  § 102(e) Date: Jun. 28, 1999
(87) PCT Pub. No.: WO99/08278
  PCT Pub. Date: Feb. 18, 1999

(30) Foreign Application Priority Data

Aug. 8, 1997 (JP) .................................................. 9-215215

(51) Int. Cl.[7] .................................................. G11B 23/03
(52) U.S. Cl. .......................................................... 360/133
(58) Field of Search .............................. 360/133; 369/291

(56) References Cited

U.S. PATENT DOCUMENTS

| | | | |
|---|---|---|---|
| 4,970,618 | 11/1990 | Kato et al. | 360/133 |
| 5,362,172 | 11/1994 | Hubbling | 360/133 |
| 5,629,823 | 5/1997 | Mizuta | 360/133 |
| 5,682,286 | 10/1997 | Mizuta | 360/133 |

FOREIGN PATENT DOCUMENTS 0 498 606 A2  8/1992  (EP) .

*Primary Examiner*—George J. Letscher
(74) *Attorney, Agent, or Firm*—Frommer Lawrence & Haug, LLP.; William S. Frommer; Matthew K. Ryan

(57) ABSTRACT

A disc cartridge housing a magnetic disc includes an engagement projection formed in the vicinity of a corner of one of the upper and lower cartridge halves so that the distal end of the engagement projection is engaged with the other cartridge half, an insertion hole formed in the other cartridge half so as to be passed through by the engagement projection of the one of the upper and lower cartridge halves and an abutment protuberantly formed around the engagement projection for compressing against the rim portion of the insertion hole formed in the other cartridge half. The engagement projection protruded from the insertion hole has its distal end heated and swollen out by a non-vibration type heating system to form a retainer to unify the upper and lower cartridge halves to complete a main cartridge body portion.

7 Claims, 4 Drawing Sheets

ASSEMBLY FOR CONNECTING THE UPPER AND LOWER CARTRIDGE HALVES OF A DISC CARTRIDGE

TECHNICAL FIELD

This invention relates to a disc cartridge housing a disc-shaped recording medium, such as a magnetic disc. More particularly, it relates to a connecting structure for upper and lower cartridge halves making up a main cartridge body portion adapted for housing a disc-shaped recording medium.

BACKGROUND ART

A disc cartridge holding a disc-shaped recording medium, such as a magnetic disc or a magneto-optical disc, has its main cartridge body portion combined from paired upper and lower cartridge halves, and a disc-shaped recording medium is rotatably housed in a disc housing section formed in the main cartridge body portion.

In the main cartridge body portion, recording/reproducing apertures are formed facing each other for exposing a portion of the signal recording area of the disc-shaped recording medium held in the disc housing section to outside across the inner and outer rims of the disc, and into which is intruded recording/reproducing means provided on a recording/reproducing apparatus. A shutter member is mounted on the main cartridge body portion for opening/closing these recording/reproducing apertures.

In the lower cartridge half constituting the lower surface of the main cartridge body portion is formed a circular center opening into which is intruded a turntable of the recording/reproducing apparatus. This center opening permits a center hub mounted at the center of the disc-shaped recording medium housed in the main cartridge body portion to be exposed to outside from the lower cartridge half.

On the inner surfaces of the main cartridge body portion are arranged protective sheets of, for example, a non-woven fabric, for protecting the disc-shaped recording medium housed therein. These protective sheets are arranged in the inner surfaces of the main cartridge body portion for sandwiching the disc-shaped recording medium in-between.

The inner surfaces of the upper and lower cartridge halves, making up the main cartridge body portion, are provided with plural fitting recesses and projections which are interengaged and ultrasonically welded to one another by ultrasonic welding means to complete a unified main cartridge body portion. These ultrasonic welding means generate mechanical vibrations on the abutting surfaces of the fitting recesses and projections to fuse the abutment surfaces by the heat of friction generated by mechanical vibrations.

In keeping up with recent tendency towards multi-media, the information signals, such as picture data or speech data, are diversified and increased in volume, thus increasing the recording capacity of the disc cartridge. For recording the information signals of the increased volume, there is proposed a disc cartridge having an increased recording density for information signals.

The main cartridge body portion housing the disc-shaped recording medium, such as the disc cartridge, is produced by interconnecting the upper and lower cartridge halves by ultrasonic welding means, so that contaminants, such as dust and dirt, are produced from the protective sheets, such as non-woven cloths, provided on the inner surfaces of the main cartridge body portion, or the upper and lower cartridge halves.

With the disc-shaped recording medium, increased in recording density, if dust and dirt of the smallest size become affixed to the signal recording area, recording and/or reproducing errors are produced at the time of recording and/or reproduction of information signals.

DISCLOSURE OF THE INVENTION

It is an object of the present invention to provide a disc cartridge in which a disc-shaped recording medium housed in a main cartridge body portion can be reliably protected in interconnecting the upper and lower cartridge halves making up the main cartridge body portion.

It is another object of the present invention to provide a disc cartridge in which contaminants, such as dust and dirt, can be reliably prevented from being produced at the time of interconnecting the upper and lower cartridge halves of the main cartridge body portion to prevent deterioration of the recording and/or reproducing characteristics of the disc-shaped recording medium due to deposition of the dust and dirt.

It is yet another object of the present invention to provide a disc cartridge in which the upper and lower cartridge halves constituting the main cartridge body portion can be unified together strongly.

For accomplishing the above objects, the present invention provides a disc cartridge housing a magnetic disc therein. The disc cartridge includes an engagement projection formed in the vicinity of a corner of one of the upper and lower cartridge halves so that the distal end of the engagement projection is engaged with the other cartridge half, an insertion hole formed in the other cartridge half so as to be passed through by the engagement projection of the one of the upper and lower cartridge halves and an abutment protuberantly formed around the engagement projection for compressing against the rim portion of the insertion hole formed in the other cartridge half. The engagement projection protruded from the insertion hole has its distal end heated and swollen out by a non-vibration type heating system to form a retainer.

With the present disc cartridge, the engagement projection formed in one of the cartridge halves is passed through the insertion hole formed in the other cartridge half, at the same time as the distal end of the abutment compresses against the rim portion of the insertion hole. The engagement projection passed through and protruded from the insertion hole is fused by heat produced by a non-vibration type heating system so as to be swollen out around the insertion hole to form the retainer.

The retainer formed at the distal end of the engagement projection is retained by the rim portion of the insertion hole. Thus, the upper and lower cartridge halves combined with each other are coupled together to form a main cartridge body portion by the rim portion of the insertion hole clinched between the retainer and the distal end of the insertion hole.

Other objects and advantages of the present invention will become clearer from the following description of the preferred embodiments of the invention.

BEST MODE FOR CARRYING OUT THE INVENTION

Figure 1:
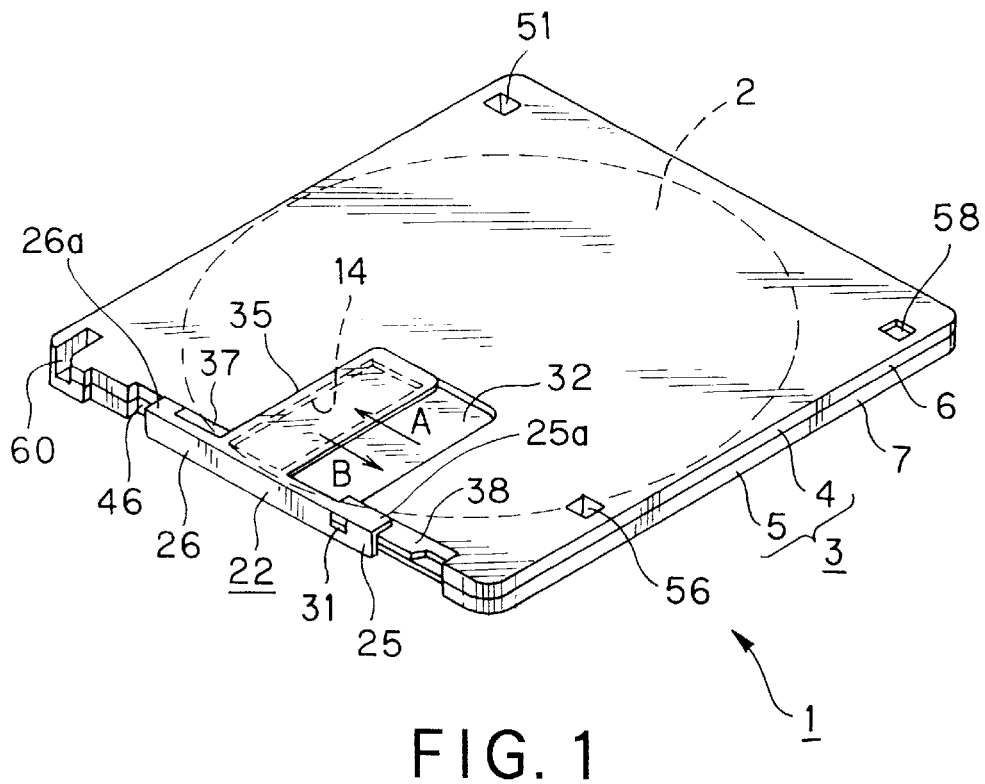
FIG. 1 is a perspective view showing a disc cartridge according to the present invention.

Referring to the drawings, preferred embodiments of a disc cartridge according to the present invention will be explained in detail.

A disc cartridge 1 of the present embodiment includes a magnetic disc 2, with a diameter of 3.5 inch, rotatably housed in a main cartridge body portion 3. The magnetic disc 2, housed in the main cartridge body portion 3, is increased in its recording capacity by having the signal recording area extended to close to its outermost rim.

Figure 2:
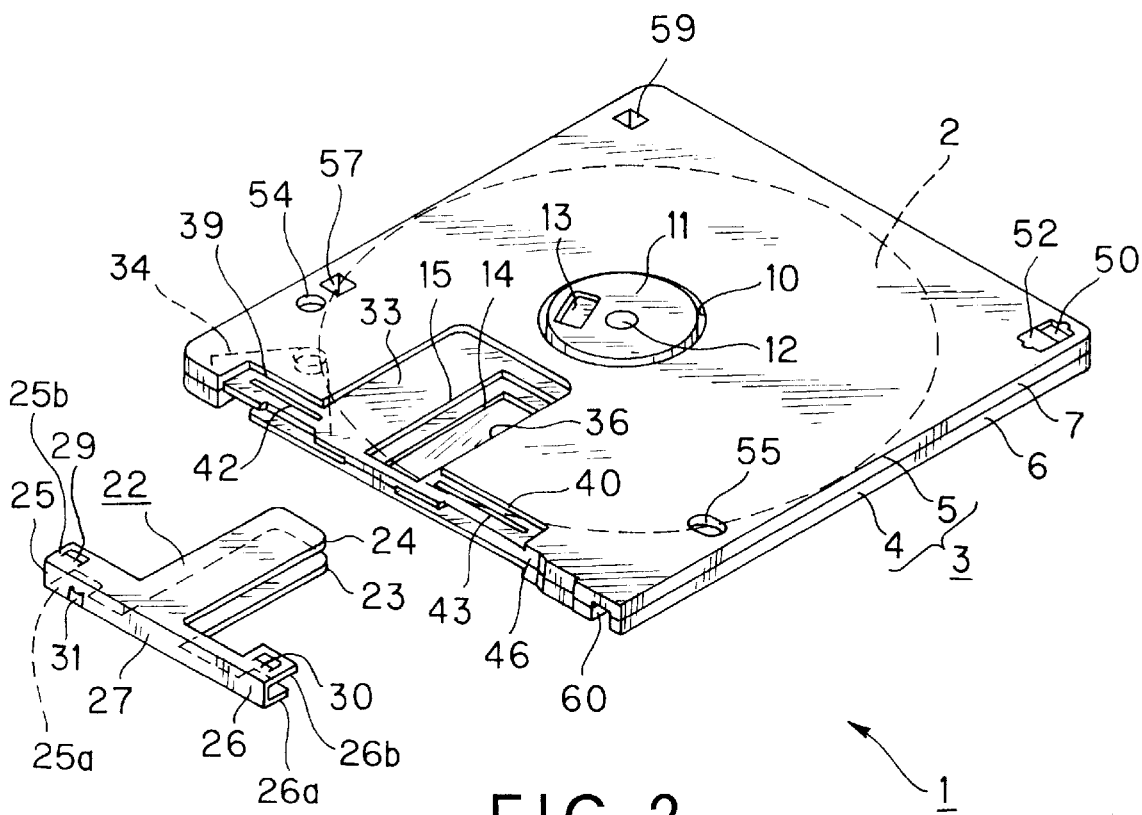
FIG. 2 is an exploded perspective view of the disc cartridge freed of a shutter member, looking from the bottom surface.

The main cartridge body portion 3 is formed by abutting and interconnecting a pair of cartridge halves of a rectangular shape, that is an upper cartridge half 4 and a lower cartridge half 5, molded from a synthetic resin material. The outer rims of the upper cartridge half 4 and the lower cartridge half 5, making up the main cartridge body portion 3, are formed as-one with outer wall sections 6, 7 abutted together to complete an outer peripheral surface of the main cartridge body portion 3, as shown in FIGS. 1 and 2. The outer wall sections 6, 7 are partially cut off on the front surface side. On the facing inner surfaces of the upper and lower cartridge halves 4, 5, disc housing section forming wall sections 9, formed as plural wall sections substantially inscribing the outer wall sections 6, 7 and which are abutted together to delimit the columnar-shaped disc housing section 8, are mounted upright, as shown in FIG. 3.

Figure 3:
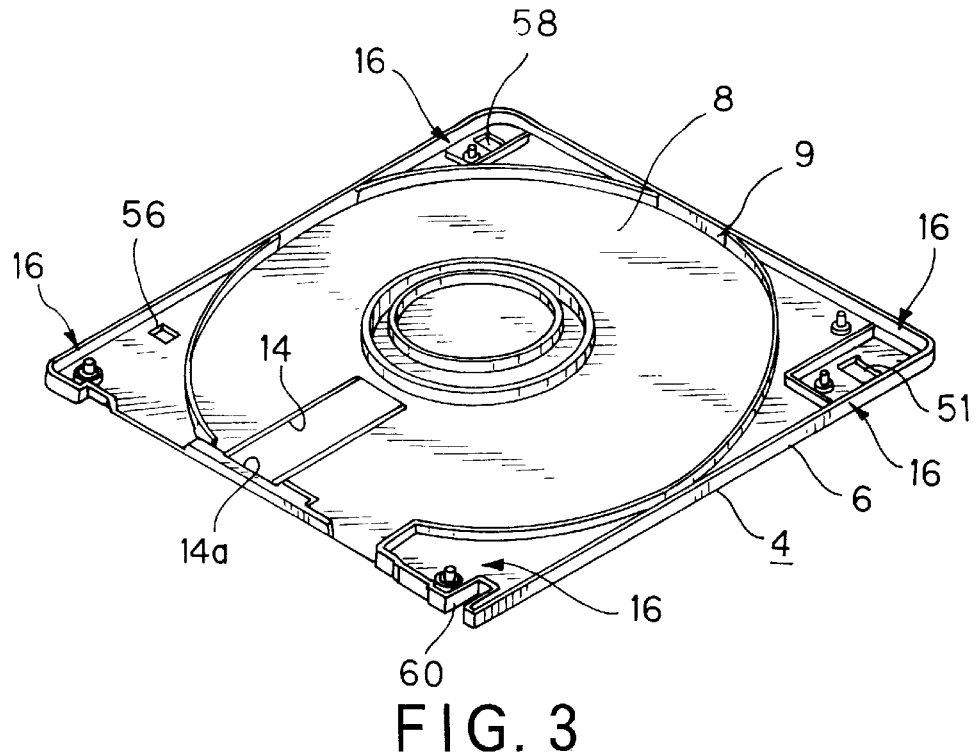
FIG. 3 is a perspective view showing the inner surface of an upper cartridge half constituting the disc cartridge.
Figure 4:
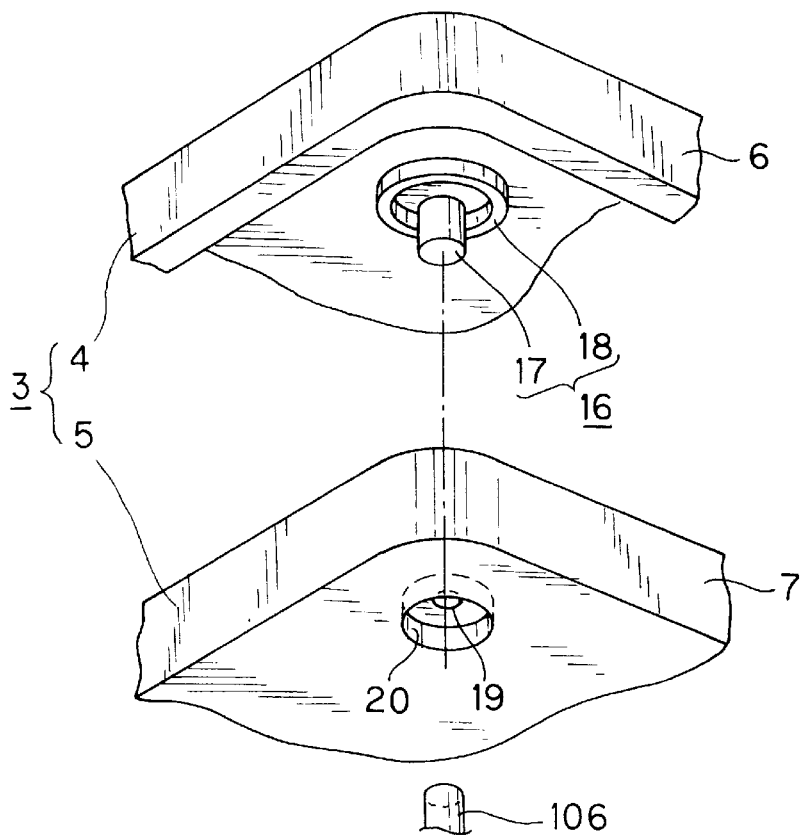
FIG. 4 is an exploded perspective view showing essential parts of the upper and lower cartridge halves constituting the disc cartridge.

On the inner surfaces of the upper cartridge half 4 are integrally formed plural connecting portions 16 in the vicinity of the corners of outer wall sections 6, 7, as shown in FIG. 3. The connecting portion 16 on the upper cartridge half 4 includes an engagement projection 17 engaged in the lower cartridge half 5 and a ring-like abutment 18 formed on the outer rim of the engagement projection 17 for abutting against the lower cartridge half 5, as shown in FIG. 4. In the lower cartridge half 5 is bored an insertion hole 19 in register with the engagement projection 17. The insertion hole 19 is passed through by the engagement projection 17 having a height sufficient to project its distal end via the insertion hole 19. When the engagement projections 17 are inserted into the insertion holes 19, the distal ends of the abutments 18 are abutted against the outer rim of the insertion holes 19. Since each abutment 18 is formed as a ring spaced a predetermined distance from the outer rim of the engagement projection 17, there is produced a gap 17a around the engagement projection 17 when the abutment 18 is abutted against the outer rim of the insertion hole 19. This gap 17a operates for absorbing the expansion of the engagement projection 17 due to thermal expansion.

Figure 5:
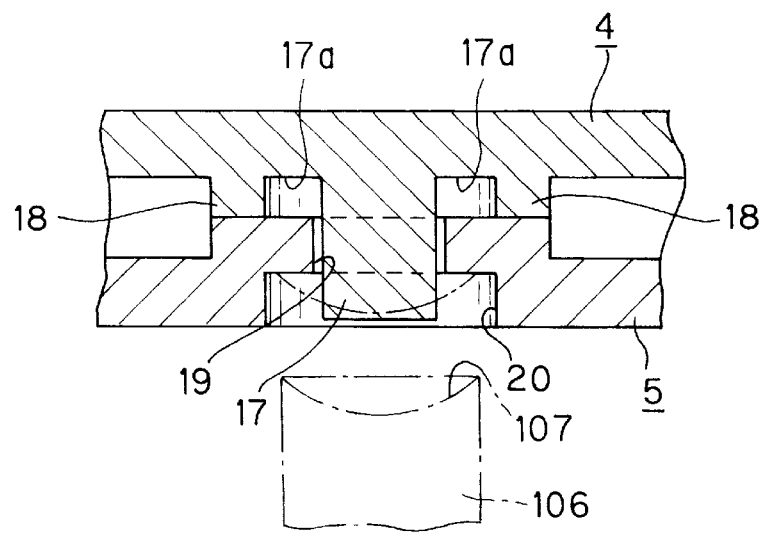
FIG. 5 is a longitudinal cross-sectional view showing engagement projections passed through insertion openings.

On the outer rim of the insertion hole 19 is formed a circular housing recess 20 in register with the distal end of the engagement projection 17 so as to be opened in the major surface of the lower cartridge half 5, as shown in FIGS. 4 and 5. In this housing recess 20 is housed the retainer 21 formed at the distal end of the engagement projection 17. This housing recess 20 is of a depth such as not to have the retainer 21 at the distal end of the engagement projection 17 protruded from the major surface of the lower cartridge half 5.

Referring to the drawings, the state in which the upper and lower cartridge halves 4, 5 are interconnected to form the above-described disc cartridge is explained.

The outer wall sections 6, 7 and the disc housing section forming wall sections 9 of the upper and lower cartridge halves 4, 5 are abutted and combined together to pass the engagement projections 17 into the insertion holes 19, at the same time as the distal ends of the abutments 18 are abutted against the outer rim portions of the insertion holes 19.

Figure 6:
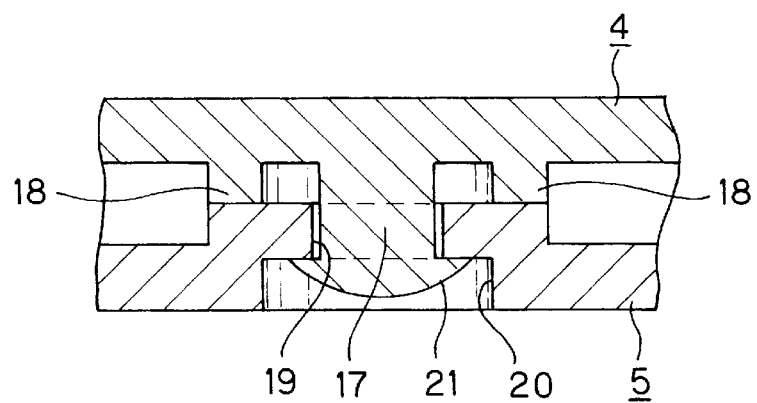
FIG. 6 is a longitudinal cross-sectional view showing an example of the state in which a retainer is formed on a distal end of an engagement projection projected from the insertion opening.

The distal ends of the engagement projections 17, projected from the insertion holes 19, are abutted against heaters 106 of a non-oscillating type heating unit, for thermally deforming the distal ends of the engagement projections 17 for forming the substantially hemi-spherical swollen-out retainer 21 which is retained by the outer rim of the insertion hole 19, as shown in FIGS. 5 and 6. This unifies the upper and lower cartridge halves 4, 5 to constitute the main cartridge body portion 3. The surfaces of the distal ends of the heating unit 106, on which is abutted the distal end each engagement projection 17, is formed as a hemispherical recess 107 for enabling formation of the substantially hemispherical retainer 21, as shown in FIG. 5.

The retainer 21, thermally deformed by the heating unit 106, is housed in the housing recess 20 in a state of not being protruded from the major surface of the lower cartridge half 5, and hence is reliably protected from the shock applied from outside.

Since no mechanical vibrations are applied to the main cartridge body portion 3 when interconnecting the upper and lower cartridge halves 4, 5 for completing the main cartridge body portion 3, it is possible to prevent dust and dirt from being produced during coupling of the upper and lower cartridge halves 4, 5, while it is also possible to prevent dust and dirt from being affixed to the magnetic disc 2 housed in the main cartridge body portion 3.

Figure 7:
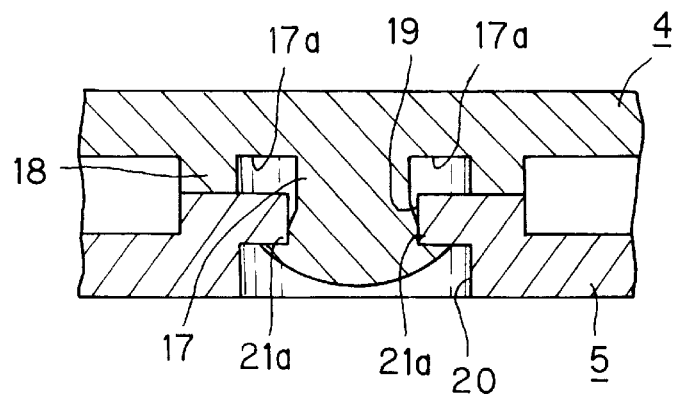
FIG. 7 is a longitudinal cross-sectional view showing another example of the state in which a retainer is formed on a distal end of an engagement projection projected from the insertion opening.

Meanwhile, the retainer 21 may also be fused and connected to the inner peripheral surface of the insertion hole 19, that is the bottom surface of the housing recess 20, or the near-by surface, by being partially fused when formed in a swollen-out shape by the heating unit 106 of the non-vibration type heating device, as shown in FIG. 7. That is, a portion 21a of the retainer 21 is fused and connected to the inner peripheral surface of the insertion hole 19 or the ambient surface.

The non-vibration type heating device used is of the type of electrically heating the heating unit 106. That is, the heating device of the type thermally E53 deforming the distal end of each engagement projection 17 without producing vibrations such as ultrasonic vibrations.

Figure 8:
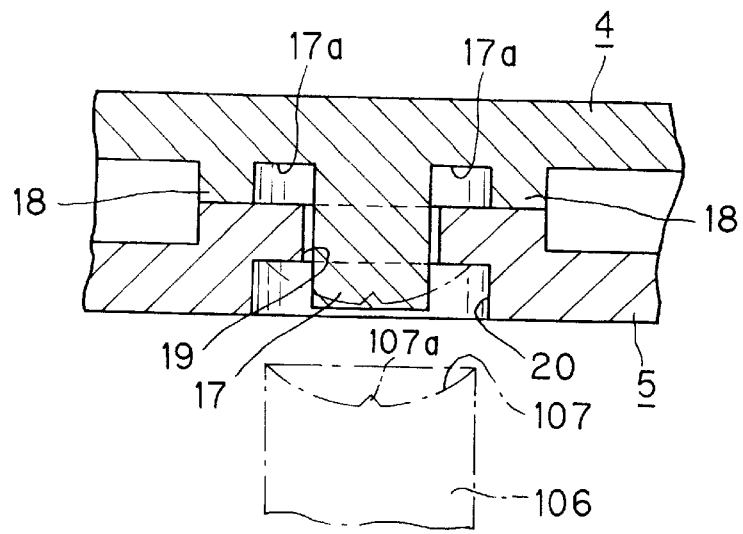
FIG. 8 is a longitudinal cross-sectional view showing another example of a heater used for thermally deforming the retainer.

Also, a projection 107a shown in FIG. 8 may be provided in a recess 107 formed on the distal end face of the heating unit 106 for promoting thermal deformation of the distal end of the engagement projection 17 during the initial heating stage of the engagement projection 17.

Although the abutment 18 in the present embodiment is formed as a ring around the outer rim of the engagement projection 17, plural arcuately-shaped abutment wall sections may be arranged in a ring shape on the outer periphery of the engagement projection 17, or plural abutment pins may be set upright around the engagement projection 17.

Figure 9:
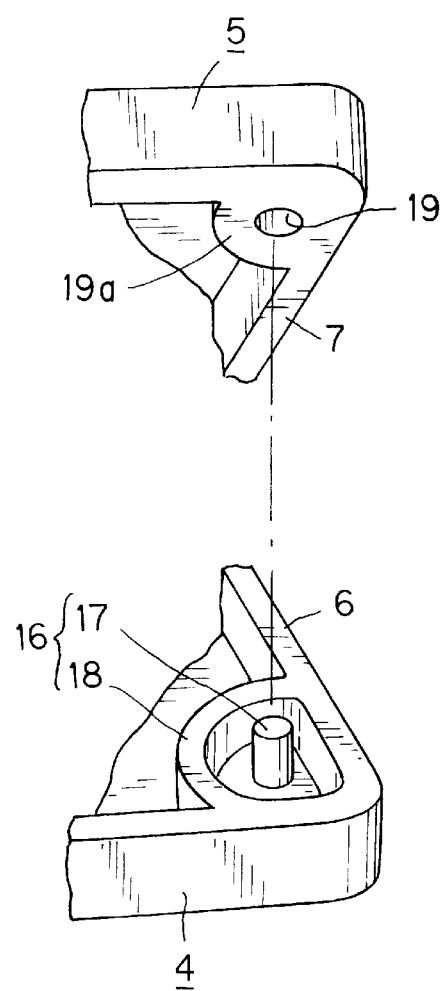
FIG. 9 is a perspective view showing essential portions of another example of the upper and lower cartridge halves making up the disc cartridge.

The abutment 18 formed around the outer rim of the engagement projection 17 constituting the connecting portion 16 may be formed in continuation to the outer peripheral wall section 6 constituting the corner of the upper cartridge half 4, as shown in FIG. 9. Also, the insertion hole 19 provided on the lower cartridge half 5 may have its peripheral wall 19a formed in continuation to an outer peripheral wall section 7 constituting the corner of the lower cartridge half 5. The engagement projection 17 and the peripheral wall 19a constituting the insertion hole 19, abutted against each other, is of the same height as the end faces of the inner and outer peripheral wall sections 6, 7 of the upper and lower cartridge halves 6, 7, abutted to each other, as shown in FIG. 9. That is, the surfaces of the engagement projection 17 and the peripheral wall 19a constituting the insertion hole 19, abutted against each other, are flush with the abutting end faces of the inner and outer peripheral wall sections 6, 7 corresponding to the split surfaces of the upper and lower cartridge halves 4, 5.

In the above embodiment, the connecting portion 16 and the insertion hole 19 are provided on the upper cartridge half 4 and on the lower cartridge half 5, respectively. Alternatively, the connecting portion 16 and the insertion hole 19 may be provided on the lower cartridge half 5 and the upper cartridge half 4, respectively.

The lower cartridge half 5, connected to the upper cartridge half 4 to constitute the main cartridge body portion 3, is formed with a center opening 10 for constituting a center opening of the disc housing section 8 into which is inserted a circular disc table, as shown in FIG. 2. In this center opening 10 is intruded a turntable of the recording/reproducing apparatus adapted for rotationally driving the magnetic disc 2 housed in the main cartridge body portion 3 when the disc cartridge 1 is loaded on the recording/reproducing apparatus. This center opening 10 permits the center hub 11 to be exposed to outside from the lower cartridge half 5. The center hub 11 is mounted for closing a center opening, not shown, of the magnetic disc 2 housed in the main cartridge body portion 3.

The center hub 11 is made up of a fitting portion of substantially the same diameter as the diameter of the center opening of the magnetic disc 2 and a flange formed for extending integrally from the outer rim of the fitting portion, and is substantially in the shape of a coupling in its entirety. This flange has a center opening 12 into which is inserted a rotary shaft of the turntable and a driving pin engagement opening 13, in the vicinity of the center opening 12, into which is intruded a driving member provided on the turntable.

In the upper and lower cartridge halves 4, 5, there are formed respectively apertures 14, 15 for exposing at least a portion of the signal recording area of the magnetic disc 2 housed in the disc housing section 8 to outside across the inner and outer rims of the disc, as shown in FIGS.1 and 2. These apertures 14, 15 are formed as rectangles and positioned at a width-wise mid portion of the upper and lower cartridge halves 4, 5 for extending from the position neighboring to the center opening 10 as far as the front side of the main cartridge body portion 3.

On the main cartridge body portion 3 is mounted a substantially T-shaped shutter member 22 for movement in the direction indicated by arrow B in FIG. 1. The shutter member 22 is formed to a U-shaped cross-section by punching and warping a metal sheet material. The shutter member 22 is made up of a pair of parallel shutter portions 23, 24, facing each other, supporting portions 25, 26 protuberantly formed on both sides of the movement direction of the shutter and a connecting piece 27 interconnecting the proximal ends of the shutter portions 23, 24 and also interconnecting the shutter portions 23, 24 and the supporting portions 25, 26.

The shutter portions 23, 24 of the shutter member 22 are substantially rectangular in shape and are sized to be slightly larger than the recording/reproducing apertures 14, 15. The supporting portions 25, 26 are provided with supporting pieces 25a, 25b and supporting pieces 26a, 26b, facing each other in parallel relation, as shown in FIG. 2. The proximal ends of the supporting pieces 25b, 25b are interconnected with those of the supporting pieces 26a, 26b via the connecting piece 27, with the supporting portions 25, 26 being approximately U-shaped in cross-section.

The supporting portions 25, 26 are provided with guide pieces 29, 30 which are formed by segmenting and perpendicularly warping inner portions of the supporting pieces 25a, 25b. These guide pieces 29, 30 are supported by the lower cartridge half 5 to permit movement of the supporting portions 25, 26. The guide pieces 29, 30 are formed in the inner portions of the supporting pieces 25b, 26b in order to assure mechanical strength.

The shutter portions 23, 24 are so formed that, when the recording/reproducing apertures 14, 15 are closed, the centerline in the width-wise direction of the shutter portions 23, 24 is closer to the lateral edge opposite to the lateral edge facing the abutment than the centerline in the width-wise direction of the apertures 14, 15. Stated differently, the shutter portions 23, 24 are so formed that, when the recording/reproducing apertures 14, 15 are closed, the width from the centerline in the width-wise direction of the apertures 14, 15 to the lateral edge thereof facing the abutment 35, 36 is smaller than the width from the centerline in the width-wise direction of the apertures 14, 15 to the lateral edge thereof opposite to the abutments 35, 36. Thus, the shutter portions 23, 24 can reliably close the apertures 14, 15 even if position shifting is caused in the abutments 35, 36 of the upper and lower cartridge halves 4, 5 or in the recording/reproducing apertures 14, 15 or dimensional tolerance values are exceeded.

The inner portion of the supporting portion 25 of the connecting piece 27 of the shutter member 22 is cut and folded to form a spring retention piece 31 for retaining one end of a shutter spring 34 arranged at a forward side corner of the lower cartridge half 5. The shutter member 22 is biased under the force of the shutter spring 34 into movement in the direction indicated by arrow A in FIG. 1 to close the recording/reproducing apertures 14, 15 by the shutter portions 23, 24.

During non-use time of the disc cartridge, such as during storage, when the shutter member 22 is not loaded on the recording/reproducing apparatus, the shutter member 22 prevents the recording/reproducing apertures 14, 15 from being inadvertently opened to prevent dust and dirt from intruding into the disc housing section 8 via these apertures 14, 15 as well as to prevent the magnetic disc from being injured. When the disc cartridge 1 is loaded on the recording/ reproducing apparatus, the shutter member 22 is engaged by the shutter opening/closure member provided on the recording/reproducing apparatus and thereby moved along the front side of the main cartridge body portion 3 in the direction indicated by arrow B in FIG. 1 against the force of the shutter spring 23, the shutter portions 23, 24 being then disengaged from the aperture 14, 15 to open these apertures.

In the outer surfaces of the upper and lower cartridge halves 4, 5, there are formed guide recesses 32, 33 for surrounding the recording/reproducing apertures 14, 15. These guide recesses guide the shutter portions 23, 24 of the shutter member 22. These guide recesses 32, 33 are formed with the abutments 35, 36 against which are abutted the lateral edges of the shutter portions 23, 24 of the shutter member 22 when the shutter member 22 is moved to the position of closing the apertures 14, 15. These abutments 35, 36 are formed facing the width-wise lateral edges of the recording/reproducing apertures 14, 15 to close reliably the apertures 14, 15 by the shutter portions 23, 24 of the shutter member 22.

In the upper cartridge half 4 are formed guide recesses 37, 38, opened in the front side of the upper cartridge half 4, on both sides of the movement direction of the shutter member 22, for guiding the movement of the supporting pieces 25a, 26a of the supporting portions 25, 26 provided on the shutter member 22. In the lower cartridge half 5 are similarly formed guide recesses 39, 40, opened in the front side of the lower cartridge half 5, on both sides of the movement direction of the shutter member 22, for guiding the movement of the supporting pieces 25b, 26b of the supporting portions 25, 26 provided on the shutter member. These guide recesses 39, 40 are provided with guide grooves 42, 43 extending along the movement direction of the shutter member 22. In these guide grooves 42, 43 are movably engaged guide pieces 29, 30 provided on the supporting pieces 25b, 26b provided on the shutter member 22.

In the front sides of the upper and lower cartridge halves 4, 5 is formed a movement recess 46 for extending along the movement direction of the shutter member 22. In this movement recess 46 is intruded the shutter opening/closure member 45 provided on the recording/reproducing apparatus for movement therein, as shown in FIGS. 1 and 2.

The opening ends 14a, 15a of the recording/reproducing apertures 14, 15, facing the outer rim of the magnetic disc 2 corresponding to the front sides of the upper and lower cartridge halves 4, 5 are provided for extending along the front sides of the upper and lower cartridge halves 4, 5 so as to be positioned between the front sides of the upper and lower cartridge halves 4, 5 and the guide grooves 42, 43, as shown in FIGS.1 and 2. That is, the opening ends 14a, 15a of the recording/reproducing apertures 14, 15 are located between the slide contact surface 46 provided on the main cartridge body portion 3 and the guide grooves 42, 43. Thus, the apertures 14, 15 can be reliably faced by recording/ reproducing means, such as a magnetic head, provided on the recording/reproducing apparatus in the vicinity of the outermost rim of the magnetic disc 2.

Also, the upper and lower cartridge halves 4, 5 are provided with a mistaken recording inhibiting member 50 for movement freely at the positions in register with a detection hole 51 and an opening 52 provided on the back side corner, as shown in FIG. 2. The mistaken recording inhibiting member 50 is used for preventing inadvertent recording of information signals on the magnetic disc 2 to erase previously recorded information signals.

In the vicinity of both axial lateral sides on the bottom surface of the lower cartridge half 5 are formed a pair of positioning holes 54, 55 for positioning the cartridge loading unit of the recording/reproducing apparatus. When loaded on the recording/reproducing apparatus, these positioning holes 54, 55 are engaged by positioning projections provided on the recording/reproducing apparatus for positioning the disc cartridge 1 with respect to the cartridge loading unit.

In the upper and lower cartridge halves 4, 5 are formed recording capacity discriminating holes 56, 57 as throughholes for discriminating the recording capacity of the magnetic disc housed in the disc cartridge. These recording capacity discriminating holes 56, 57 may also be formed as recesses opening on the lower cartridge half 5 constituting the lower surface of the main cartridge body portion 3 without passing through the upper and lower surfaces of the main cartridge body portion 3.

In one corner on the front side of the upper cartridge half 4 is formed a design parameter discriminating cut-out 60 for discriminating the design parameters of the disc cartridge 1 on loading the disc cartridge 1 on the cartridge loading unit of the recording/reproducing apparatus. The design parameters of the disc cartridge 1 are detected based on whether or not a design parameter detection member on the recording/ reproducing apparatus can be inserted into the design parameter discriminating cut-out 60.

Between the inner wall section of the upper cartridge half 4 and the magnetic disc 2 and between the inner wall section of the lower cartridge half 5 and the magnetic disc 2, there are arranged an upper protective sheet and a lower protective sheet secured to the upper cartridge half 4 and to the lower cartridge half 5, respectively. These upper and lower protective sheets are formed by non-woven cloths in the form of rings each having an outer diameter substantially equal to the diameter of the magnetic disc 2 and a center opening larger in diameter than the center opening of the magnetic disc 2.

The upper and lower protective sheets are formed with cut-outs extending radially from the outer rim towards the center opening. These cut-outs are slightly larger than the opening sizes of the recording/reproducing apertures 14, 15 provided in the upper cartridge half 4 and in the lower cartridge half 5, respectively.

On the lower cartridge half 5 is secured a lifter plate, not shown, obtained on warping a thin metal plate or a sheet of a synthetic resin in the chevron shape. This lifter plate has its upstanding end thrust in a hoisting fashion by the lower surface of the lower protective sheet welded to the inner wall of the lower cartridge half 5 for thrusting the lower protective sheet against the lower surface of the magnetic disc 2.

When the disc cartridge 1 of the present invention is loaded on the recording/reproducing apparatus and the magnetic disc 3 housed in the main cartridge body portion 3 is run in rotation to record or reproduce information signals, the upper protective sheet and the lower protective sheet are brought into sliding contact by the lifter operation with the upper and lower surfaces of the magnetic disc 2 with a light contact pressure. The magnetic disc 2 is torque-barked by the contact pressure of the upper and lower protective sheets so that it is rotated smoothly without rotational fluctuations.

The lifter plate is provided optionally. In the case of the disc cartridge in which is held a magnetic disc 2 rotated at an elevated velocity, the lifter is occasionally omitted for evading load application to the rotating magnetic disc 2.

With the disc cartridge 1 of the present invention, since the engagement projection 17 and the abutment 18 are provided on the upper cartridge half 4 and the insertion hole 19 is formed in the lower cartridge half 5, there are produced no mechanical vibrations in the upper and lower cartridge halves 4, 5, so that it is possible to prevent dust and dirt from becoming affixed to the signal recording area of the magnetic disc 2 housed in the disc cartridge.

Thus, with the disc cartridge 1 according to the present invention, the recording/reproducing operation by the magnetic disc 2 is improved in reliability while the upper and lower cartridge halves 4, 5 can be reliably unified to each other. Therefore, the present disc cartridge 1 is used with advantage as a main cartridge body portion for housing the magnetic disc having the increased recording density.

Although the disc cartridge according to the present invention employs a magnetic disc as a disc-shaped recording medium, this is merely illustrative and the recording medium may also be an optical disc or a magneto-optical disc other than the magnetic disc.

INDUSTRIAL APPLICABILITY

Specifically, with the disc cartridge of the present invention, the distal end of the engagement projection of one of the cartridge halves is swollen out by the operation of a fusing system of the nonvibration heating type to form a retainer retained by the rim portion of the insertion hole. The abutment protuberantly formed around the engagement projection compresses against the rim portion of the insertion hole to prevent deposition of dust and dirt on the signal recording area of a disc-shaped recording medium held in the disc cartridge. Thus, not only is the recording/reproducing operation of the disc-shaped recording medium improved, but also the upper and lower cartridge halves are coupled together reliably.

What is claimed is:

1. A disc cartridge comprising:

paired upper and lower cartridge halves forming a main cartridge body portion for housing a disc-shaped recording medium;

an engagement projection integrally formed in the vicinity of a corner of one of the upper and lower cartridge halves so that the distal end thereof is engaged with the other cartridge half;

an insertion hole integrally formed in the other cartridge half so as to be passed through by said engagement projection of said one of the upper and lower cartridge halves, said insertion hole having a rim portion;

an abutment protuberantly formed around said engagement projection for compressing against the rim portion of said insertion hole formed in the other cartridge half wherein said abutment is integrally formed in the same cartridge half as said engagement projection; and the distal end of said engagement projection protruded via said insertion hole is deformed by non-vibration heating means so as to form a retainer in said insertion hole to secure said upper and lower cartridge halves.

2. The disc cartridge according to claim 1 wherein a housing recess for housing the retainer at the distal end of the engagement projection is formed on the outer rim side of said insertion hole so as to be opened on the major surface of the other cartridge half;

said housing recess being of a depth of not allowing the retained retainer from the major surface of the other cartridge half.

3. The disc cartridge according to claim 1 wherein a protective sheet for protecting the disc-shaped recording medium is provided on the inner surface side of said main cartridge body portion.

4. The disc cartridge according to claim 1 wherein said abutment is annular.

5. The disc cartridge according to claim 1 wherein said abutment is formed in continuation to the outer peripheral wall of said one cartridge half.

6. The disc cartridge according to claim 1 wherein the rim portion of said insertion hole is formed in continuation to the outer peripheral wall of said one cartridge half.

7. The disc cartridge according to claim 1 wherein an abutment surface compressing against the abutment is formed around said insertion hole so as to be flush with the splitting surface of said upper and lower cartridge halves.

* * * * *